United States Patent Office

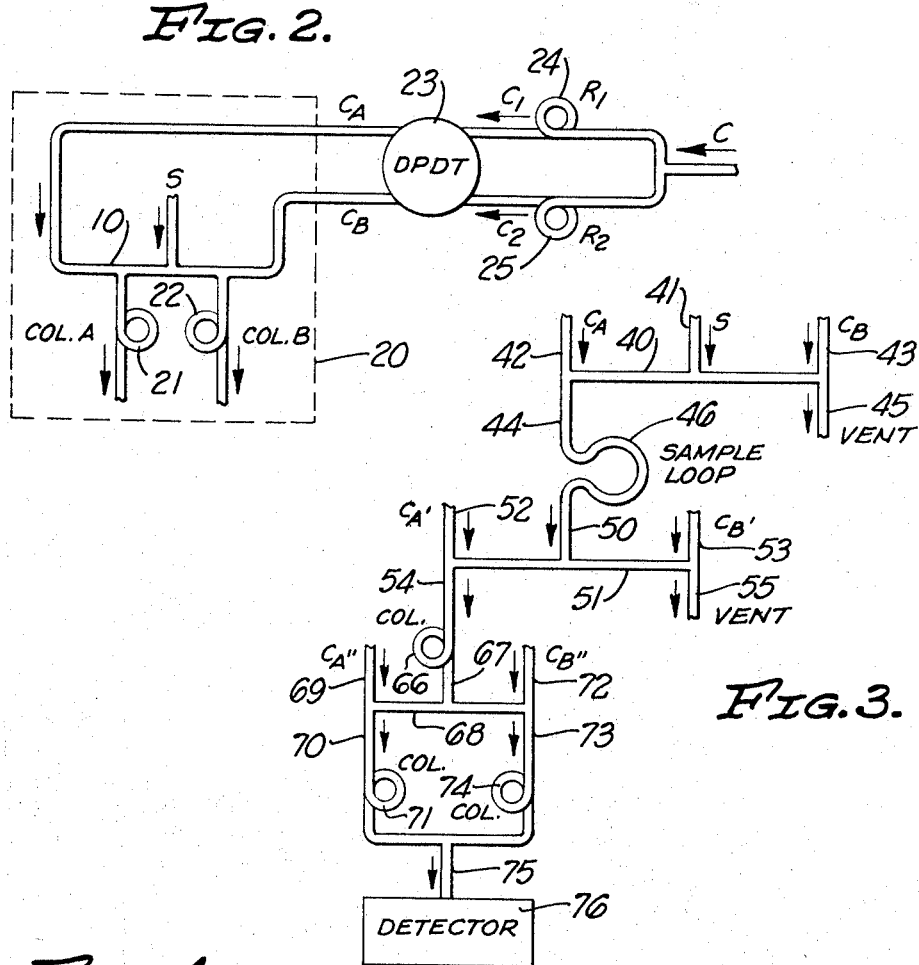

3,426,600
Patented Feb. 11, 1969

3,426,600
GAS FLOW CONTROL SYSTEM
Julius H. Bochinski, La Habra, Calif., assignor to Beckman Instruments, Inc., a corporation of California
Filed Jan. 14, 1966, Ser. No. 520,593
U.S. Cl. 73—422
Int. Cl. G01n 1/26
4 Claims

ABSTRACT OF THE DISCLOSURE

A valving arrangement without moving parts for selectively switching a fluid stream flowing into a manifold or conduit from an inlet into one of two outlets in the manifold disposed on opposite sides of the inlet. The valve arrangement includes at least two control lines, one each being connected into the manifold between the inlet and each respective outlet. By varying the rate of flow of fluid into the manifold from the control lines, the direction of flow of the inlet stream may be switched from one outlet to the other.

---

This invention relates to gas flow control systems which may be substituted for conventional valves. The flow control system is particularly suitable for use in gas chromatographs and similar apparatus and is especially adapted for operation at elevated temperatures where many problems are encountered when utilizing conventional valves. The gas flow control system of the invention will be specifically described herein as utilized in column switching and in sample injection but it should be noted that the system is not limited to these specific applications and can be employed for a wide range of flow control problems in the same manner that conventional valves are presently employed. For example, the flow control system may be utilized in process stream monitoring, in operation of precut columns, in making heart cuts, in dual column operation, in rapid pulse sampling, in trapping operations, in selective detection, in peak isolation, and the like.

When an instrument such as a gas chromatograph is operated at elevated temperatures, the conventional multiport valves utilized therein are made of special materials and construction to minimize deterioration and scoring of sliding surfaces in order to improve the life of the valve and reduce leakage occurring therein. It is an object of the present invention to provide a new and improved gas flow control system which does not require moving parts, thereby eliminating many problems encountered in normal valves both at room temperatures and at elevated temperatures as well as at very low temperatures. It is a specific object of the invention to provide a gas flow control system wherein the flow directing elements may be remotely positioned from any valves operative therewith, permitting positioning of the flow directing elements in any adverse environment, such as the elevated temperatures of chromatograph sample lines and columns.

It is an object of the invention to provide a gas flow control system including a distributor, a main inlet on the distributor, first and second control inlets positioned on the distributor on opposite sides of the main inlet, and first and second outlets positioned on the distributor on opposite sides of the main inlet. A further object is to provide such a flow control system including means for selectively directing a gas stream to the first control inlet at a higher and a lower rate of flow and to the second control inlet at a lower and a higher rate of flow, with one control inlet having its higher rate when the other control inlet has its lower rate, whereby the gas stream introduced at the main inlet flows out the outlet on the side of the distributor opposite to the control inlet having its higher rate of flow. A further object is to provide such a system for operation in a gas chromatograph with the sample bearing stream or the stream to be controlled connected to the main inlet and with carrier streams or other control streams connected to the control inlets. An additional object is to provide such a system wherein the means for directing the streams to the control inlets at higher and lower rates of flow may be conventional valves located remotely from the distributor.

It is an object of the invention to provide such a gas flow control system incorporating an input zone such as a sample loop for the purpose of introducing a predetermined quantity of the main inlet stream into one of the outlet streams.

It is a particular object of the invention to provide a gas flow control system which can be cascaded with one or more additional gas flow control systems to provide all the flow paths necessary within an instrument such as a gas chromatograph.

It is an object of the invention to provide a gas flow control system incorporating a plurality of main inlets and providing for selectively switching each main inlet stream to selected outlets and for combining the main inlet streams at an outlet.

The invention also comprises novel combinations and arrangements of parts and novel methods of operation which will more fully appear in the course of the following description. The drawing merely shows and the description merely describes preferred embodiments of the present invention which are given by way of illustration or example.

In the drawing:

FIG. 1 is a diagrammatic illustration of a preferred form of the gas flow control system;

FIG. 2 is a diagrammatic illlustration of the gas flow control system operated in conjunction with a gas chromatograph;

FIG. 3 is a diagrammatic illustration showing one manner in which the gas flow control system can be cascaded; and FIG. 4 is a diagrammatic illustration showing one manner in which the gas flow control system can be used with two main inlets.

The system of FIG. 1 includes a distributor line 10 and a main inlet line 11 to the distributor line. A control inlet line 12 and an outlet line 13 are positioned on the distributor on one side of the main inlet 11. Another control inlet line 14 and an outlet line 15 are positioned on the distributor on the opposite side of the main inlet 11.

The gas streams to be controlled, typically the sample bearing stream in a gas chromatograph, is connected to the main inlet 11. Control gas streams, typically carrier gas in a chromatograph, are connected to the control inlets 12 and 14. The direction of flow of the main stream through the outlet 13 or the outlet 15 can be controlled by controlling the rates of flow at the two control inlets 12 and 14. A means is provided for selectively connecting a gas stream at a higher rate and at a lower rate of flow to the control inlet 12. Means is also provided for connecting a gas stream at a lower rate and at a higher rate of flow to the control inlet 14. With the higher flow rate at the inlet 12 and the lower flow rate at the inlet 14, all the flow at the main inlet 11 will be directed out the outlet 15. Similarly, with the higher rate of flow at the inlet 14 and the lower rate of flow at the inlet 12, the main stream will be directed out the outlet 13.

As a typical example, consider a system having a 30 cc./min. sample bearing stream rate of flow at the main inlet, with each of the carrier streams at the control inlets switchable between 10 cc./min. and 60 cc./min., and with the outlets having substantially equal flow impedance. With carrier A at 10 cc./min. and carrier B at 60 cc./min., the outlet B will have a flow rate of pure carrier at 50 cc./min. and the outlet A will have a flow rate of 50 cc./min. comprising the entire 30 cc./min. sample stream flow and 20 cc./min. carrier. When the flow rates of both carrier streams are reversed, there will be a pure carrier flow at outlet A and a mixed carrier and sample stream flow at outlet B. Thus it is seen that the desired flow control is achieved without requiring any moving parts in the control zone, since the conventional valve arrangement for changing the carrier rates of flow can be positioned remote from the distributor line 10.

A typical installation of the gas flow control system in a chromatograph for column switching, with a typical valving arrangement for carrier rate switching is illustrated in FIG. 2. The distributor line 10 is located within a gas chromatograph indicated by the dashed line 20. One outlet from the distributor is connected to chromatograph column 21 and the other outlet is connected to a chromatograph column 22. A source of carrier gas is connected to one input of a double pole double throw valve 23 through a first flow impedance or restrictor 24 and to the second input of the valve 23 through another flow impedance 25. The flow impedance 24 typically may be a restriction for the line designed to provide a first flow rate $C_1$ and the impedance 25 a similar restriction designed to provide a second flow rate $C_2$. The valve 23 may be a typical multiport valve or a combination of valves for connecting, in one position, the $C_1$ input to the $C_A$ output and the $C_2$ input to the $C_B$ output and, in the other position, the $C_1$ input to the $C_B$ output and the $C_2$ input to the $C_A$ output.

In operation of the system of FIG. 2, consider for example, the situation where the $C_1$ carrier flow rate is higher than the $C_2$ carrier flow rate. Then when the valve 23 is connecting the higher $C_1$ flow to the $C_A$ line, the sample bearing stream at S will be directed through column B. When the valve 23 is turned to the other position connecting the $C_1$ flow to the $C_B$ line, the sample bearing stream will be switched to the column A. It is readily seen that the distributor 10 and the associated inlets and outlets can be positioned at any location within the chromatograph and may be operated at any temperature without adverse effects. At the same time, the valve 23 may be positioned remote from the distributor and externally of the chromatograph where it is not subject to the temperature environment of the chromatograph.

It will be readily seen that the gas flow control system of the invention is not limited to the particular valve 23 of FIG. 2 and that any arrangement of valving can be utilized for switching the rates of flow at the control inlets. In one alternative, the lower flow rate for each control inlet $C_A$, $C_B$ may be fixed and the higher flow rate may be obtained by means of a single pole double throw valve which selectively directs an additional carrier stream to one or the other of the control inlets. Also, it should be noted that the same high and low rates do not have to be used for the two control inlets but normally it is more convenient to do so. The magnitudes desirable for the higher and lower control flows at each of the control inlets will vary with the rate of flow at the main inlet and the ratio of flow impedances at the two outlets and can readily be determined from a consideration of the over-all apparatus. In the most common situation where the flow impedance of the two outlets is substantially equal, the higher rate of flow at one control inlet must be greater than the sum of the flow rate at the main inlet and at the other control inlet having the lower rate of flow to insure that the entire main inlet flow is switched to the opposite outlet. The gas flow control may be achieved with the lower rate of flow zero but it is preferred to always maintain some flow in each of the control inlets in order to prevent diffusion of main inlet flow backward through the lower rate of flow inlet.

FIG. 3 illustrates cascading use of the gas flow control system of the invention for injecting a quantity of a sample into a gas chromatograph and for column switching in the chromatograph. A distributor 40 has a main inlet 41, a control inlet 42, another control inlet 43, an outlet 44 and another outlet 45. An input zone such as a sample loop 46 is connected between the outlet 44 and the main inlet 50 of another stage including a distributor 51, a control inlet 52, another control inlet 53, an outlet 54 and another outlet 55. In the particular embodiment illustrated, the outlets 45 and 55 are vented to the atmosphere. It should be noted that the relative position of the control inlet and outlet on one side of the main inlet is not significant in any embodiment of the control system of the invention.

The outlet 54 may be connected through a column 66 to the main inlet 67 of another distributor 68. A control inlet 69 and an outlet 70 to a column 71 are provided on one side of the main inlet 67. Another control inlet 72 and an outlet 73 to a column 74 are provided on the opposite side of the main inlet. The outputs from the columns 71 and 74 may be combined in a line 75 providing an input to a chromatograph detector 76. The columns and detector referred to herein may be those used in conventional gas chromatographs and need not be described in detail.

In the operation of the system of FIG. 3, the sample bearing stream is connected to the main inlet 41, a control stream at its higher rate of flow is connected to the control inlet 43, and a control stream at its lower rate of flow is connected to the control inlet 42. A control stream at its higher rate of flow is connected to the control inlet 52 and a control stream at its lower rate of flow is connected to the control inlet 53. Under these conditions, the entire sample bearing stream is directed through the sample loop and is vented through the outlet 55. When it is desired to inject a quantity of sample into the column 66, the rates of flow at the control inlets are switched to provide the lower rate of flow at the inlets 43 and 52 and the higher rate of flow at the inlets 42 and 53. That portion of the sample bearing stream in the loop 46 plus that in the outlet 44 and inlet 50 is now moved out the outlet 54 and into the column 66. At the completion of sample injection, the rates of flow at the control inlets are returned to the first condition.

In a typical installation, the column 66 may provide for sample splitting or separation of the sample into a first group of relatively high volatility and a second group of relatively low volatility. The higher volatility constituents will exit from the column 66 first and may be directed onto the column 71 by having the higher rate of flow at the control inlet 72 and a lower rate of flow at the control inlet 69. At the appropriate time, the control rates of flow are switched to direct the subsequent lower volatility constituents to the column 74. Of course, the column 66 is not essential to the cascading operation or to the sample injection, and various chromatograph configurations may be utilized. A chemical modifier or a trap may be incorporated in the system when desired as, for example, in the place of the column 66.

FIG. 4 illustrates a parallel type arrangement of the gas flow control system of the invention which is particularly adapted for selecting or mixing of a plurality of input streams. The system includes a distributor 80 wtih a first main inlet 81 and associated control inlets 82, 83, and a second main inlet 84 with associated control inlets 85, 86. An outlet 87 is positioned to the outside of the main inlet 81, an outlet 88 is positioned between the main inlets, and an outlet 89 is positioned to the outside of the main inlet 84. The system may be operated to direct the stream at the main inlet 81 to the outlet 87 or to the outlet 88 and to direct the stream at the main inlet 84 to the outlet 89 or to the outlet 88. The system may be operated to direct both inlet streams through the outlet 88 at the same time or at different times. With this arrangement, two sample bearing streams can be selectively connected to the central outlet providing a choice of neither, either, or both streams at any time.

As an example in the system of FIG. 4, the rates of flow, in cc./min., may be $C_A$ 10, $S_1$ 20, $C_B$ 40, $C_C$ 40, $S_2$ 20, and $C_D$ 10. The outlet rates will be $O_A$ 35, $O_B$ 70, and $O_C$ 35. Under these conditions, the inlet stream at 81 will leave at the outlet 87 and the inlet stream at 84 will leave at the outlet 89. The $S_1$ stream may be directed to the outlet 88 by increasing $C_A$ to 40 and decreasing $C_B$ to 10. Similarly, the $S_2$ inlet may be directed to the outlet 88 by decreasing $C_C$ to 10 and increasing $C_D$ to 40. These switching operations may be performed sequentially for selectively directing the two inlet streams to the center outlet or they may be performed at the same time to combine the two inlet streams at the outlet 88.

Although exemplary embodiments of the invention have been disclosed and discussed, it will be understood that other applications of the invention are possible and that the gas flow control system can be utilized for a wide range of functions in gas chromatographs as well as in other apparatus.

I claim as my invention:

1. In a gas flow control system, the combination of:
   a first distributor;
   a first main inlet on said first distributor;
   first and second control inlets positioned on said first distributor on opposite sides of said first main inlet;
   first and second outlets positioned on said first distributor on opposite sides of said first main inlet;
   means for selectively directing a gas stream to said first control inlet at a higher and a lower rate of flow, and to said second control inlet at a lower and a higher rate of flow, with one control inlet having its higher rate when the other control inlet has its lower rate, whereby the gas stream introduced at said first main inlet flows out the outlet on the side of said first distributor opposite to the control inlet having its higher rate of flow;
   a double pole double throw gas valve unit having first and second inputs and third and fourth outputs and adapted to selectively switch said first input between said third and fourth outputs and said second input between said fourth and third outputs;
   means for connecting said third output to said first control inlet and said fourth output to said second control inlet;
   first and second flow impedance units having different impedance values; and
   means for connecting said first and second impedance units in parallel between a gas source and said first and second inputs respectively.

2. A system as defined in claim 1 including:
   a second distributor;
   a second main inlet on said second distributor;
   third and fourth control inlets positioned on opposite sides of said second main inlet;
   third and fourth outlets positions on said second distributor on opposite sides of said second main inlet;
   means for connecting said first outlet to said second main inlet; and
   means for selectively directing a gas stream to said third control inlet at a higher and a lower rate of flow, and to said fourth control inlet at a lower and a higher rate of flow, with one control inlet having its higher rate when the other control inlet has its lower rate.

3. A system as defined in claim 2 wherein said second and fourth outlets are vents, and a sample zone is included in said connecting means between said first outlet and second main inlet.

4. A system as defined in claim 1 including:
   a second distributor connected to said first distributor adjacent said second outlet;
   a second main inlet on said second distributor;
   third and fourth control inlets positioned on said second distributor on opposite sides of said second main inlet;
   a third outlet positioned on said second distributor on the side opposite said second outlet; and
   means for selectively directing a gas stream to said third control inlet at a higher and a lower rate of flow, and to said fourth control inlet at a lower and a higher rate of flow, with one control inlet having its higher rate when the other control inlet has its lower rate,
   whereby the gas stream introduced at said second main inlet flows out the outlet on the side of said second distributor opposite to the control inlet having its higher rate of flow.

References Cited

UNITED STATES PATENTS 3,237,380  3/1966  Barrett _____ 55—67
3,357,233  12/1967  Roof _____ 73—23.1

S. CLEMENT SWISHER, *Primary Examiner.*